United States Patent [19]
Bridgland et al.

[11] 3,875,109
[45] Apr. 1, 1975

[54] COMPOSITIONS RESISTANT TO BURNING

[75] Inventors: Brian Edward Bridgland; Derek James Rowland Massy; Bernard Peter Stark, all of Cambridge, England

[73] Assignee: Ciba-Geigy AG, Basel, Switzerland

[22] Filed: Aug. 30, 1973

[21] Appl. No.: 392,919

[30] Foreign Application Priority Data
Sept. 1, 1972 United Kingdom .............. 40652/72

[52] U.S. Cl. ... 260/45.7 R, 260/2.5 AJ, 260/2.5 BB, 260/37 R, 260/42.17, 260/42.18, 260/45.75 N, 260/45.85 R, 260/45.95 R
[51] Int. Cl. ............................................. C08d 7/10
[58] Field of Search . 260/45.7 R, 45.85 R, 45.75 N, 260/45.95 R, 2.5 AJ, 2.5 BB

[56] References Cited
UNITED STATES PATENTS
3,651,174   3/1972   Bialous .......................... 260/45.7 R

*Primary Examiner*—Melvyn I. Marquis
*Attorney, Agent, or Firm*—Joseph G. Kolodny; Edward McC. Roberts; Prabodh I. Almaula

[57] ABSTRACT

Compositions suitable for use as moulding resins, floor-covering compositions, casting, dipping, sealing, impregnating and filling resins, adhesives and foams comprise (i) an unsaturated ester of the general formula

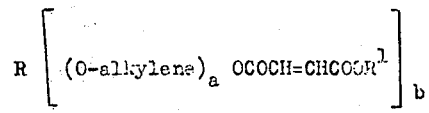

where a is an integer of at least 1, b is an integer of at least 2 and at most 6, R denotes the radical of valency b remaining after removal of b alcoholic hydroxyl groups from a polyhydric alcohol or after removal of b phenolic hydroxyl groups from a polyhydric phenol, or the acyl radical remaining after the removal of b OH groups from a compound having at least b carboxyl groups, each "alkylene" group contains a chain of at least 2 and at most 6 carbon atoms between consecutive oxygen atoms, $R^1$ represents –H or the monovalent residue of an alcohol after removal of an -OH group, (ii) a polymercaptan having, per average molecule, at least two mercaptan groups, the sum of the number of the indicated ethylenic bonds in the unsaturated ester (i) and the number of the mercaptan groups in the polymercaptan (ii) being more than 4, and (iii) a salt or hydroxide of an alkali metal.

These compositions cure, optionally in the presence of a Bronstead base as accelerator, to give products which are resistant to burning.

14 Claims, No Drawings

COMPOSITIONS RESISTANT TO BURNING

This invention relates to certain curable mixtures of polyenes and polymercaptans which yield cured products showing a high resistance to burning.

We have found that by incorporating relatively small amounts of a salt or the hydroxide of an alkali metal in compositions obtained by curing certain polyenes, having at least two ethylenic double bonds each α to a carbonyloxy group, with polymercaptans, materials with increased resistance to burning are obtained: further, even when the products can be ignited, they emit little smoke. Resistance to burning and emission of little or no smoke are obviously desirable features of plastics materials to be used in shops, factories, homes, and other places where fire hazards exist.

The present invention provides compositions which cure to form products resistant to burning, comprising i. an unsaturated ester of the general formula

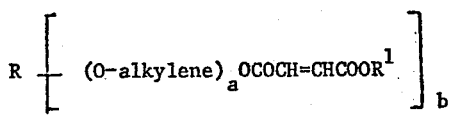

where
a is an integer of at least 1,
b is an integer of at least 2 and at most 6,
R denotes the radical of valency b remaining after removal of b alcoholic hydroxyl groups from a polyhydric alcohol or after removal of b phenolic hydroxyl groups from a polyhydric phenol, or the acyl radical remaining after removal of b OH groups from a compound having at least b carboxyl groups,
each "alkylene" group contains a chain of at least 2 and at most 6 carbon atoms between consecutive oxygen atoms,
$R^1$ represents -H or the monovalent residue of an alcohol after removal of an -OH group, ii. a polymercaptan having, per average molecule, at least two mercaptan groups, the sum of the number of the indicated ethylenic double bonds in the unsaturated ester (i) and the number of the mercaptan groups in the polymercaptan (ii) being more than 4, preferably from 5 to 8, and iii. a salt or hydroxide of an alkali metal.

Another aspect of this invention provides products obtained by curing the aforesaid curable compositions.

A further aspect provides a process for forming a product resistant to burning, which comprises curing a polymercaptan having, per average molecule, at least two mercaptan groups, with an unsaturated ester of formula I, the sum of the mercaptan groups in the polymercaptan and the indicated ethylenic double bonds of the said ester being more than 4, and preferably from 5 to 8, in the presence of an effective amount of a salt or the hydroxide of an alkali metal. "Curing" includes "allowing to cure."

Desirably, the polymercaptan has an average molecular weight of at most 10,000 and contains up to 6 mercaptan groups per average molecule. Preferably at least one of the unsaturated ester and the polymercaptan has an average molecular weight in the range 1,000 to 6,000.

The preferred unsaturated esters (i) have an average molecular weight in the range 400 to 10,000. Further preferred are those of formula I in which R represents an aliphatic radical containing from 3 to 60 carbon atoms, especially a saturated hydrocarbon radical of not more than 6 carbon atoms, or a radical of one of the formulae

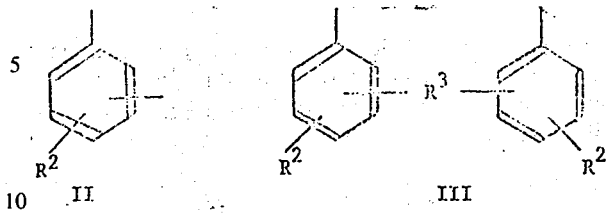

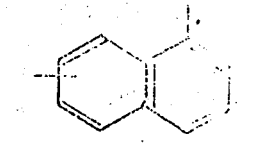

and

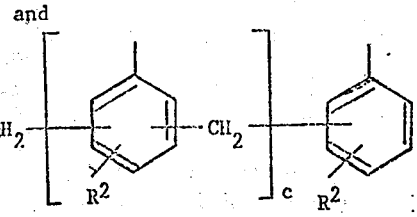

where
$R^2$ denotes -H, -Cl, -Br, or an alkyl or alkenyl group of up to 9 carbon atoms,
$R^3$ denotes a carbon-carbon bond, an alkylene hydrocarbon group of from 1 to 4 carbon atoms, or an ether oxygen atom, and
c is an integer of from 1 to 4.

Alkylene units in individual poly(oxyalkylene) chains may be the same or different and they may be substituted by e.g., phenyl, hydroxyl, or chloromethyl groups. Preferably the "alkylene" units are —$C_2H_4$— or —$C_3H_6$— groups.

$R^1$ preferably represents hydrogen, but it may also be, for example, an alkyl group of 1 to 6 carbon atoms, such as an n-butyl group, or a group of formula

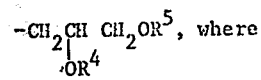

where
$R^4$ represents -H or a group of formula

—COCH=CHCOOR⁶, $R^5$ represents a monovalent alkyl group of 1 to 16 carbon atoms, especially an n-butyl group, an alkenyl group of 2 to 16 carbon atoms (such as an allyl group), an aliphatic acyl group of 2 to 16 carbon atoms (such as the acyl residue of a tertiary monocarboxylic acid of 9 to 11 carbon atoms), or a phenyl group, which may be substituted by one or two alkyl groups, each of 1 to 9 carbon atoms, or by chlorine (such as phenyl, p-cresyl, or p-chlorophenyl), and $R^6$ represents -H, an alkyl or alkenyl group of 1 to 6 carbon atoms, or a group of formula

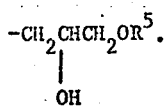

Compounds of formula I where $R^1$ denotes hydrogen are obtainable by reaction of the alcohol of formula VI

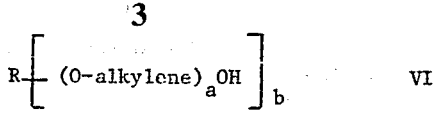  VI with maleic anhydride. The resultant poly(hydrogen maleate) may then be esterified in a conventional manner with an alcohol $HOR^1$, or treated with a glycidyl ether or a glycidyl ester of formula

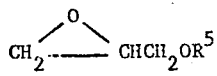  VII to yield the ester of formula

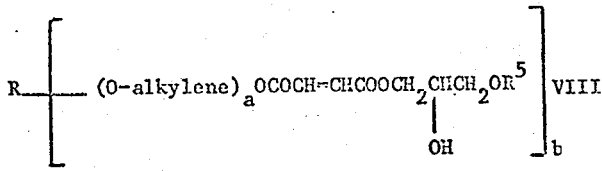  VIII and the secondary hydroxyl group so formed may, if desired, be esterified.

A wide range of polymercaptans is suitable for incorporation in the composition of this invention.

One class, which is preferred because of the ready availability of many of its members, comprises esters of monomercaptancarboxylic acids with polyhydric alcohols and of monomercaptanmonohydric alcohols with polycarboxylic acids.

Further preferred such esters are of the formula

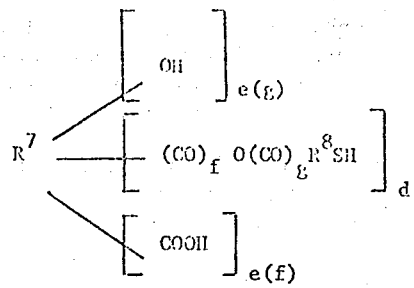  IX where $R^7$ represents an aliphatic or araliphatic hydrocarbon radical of at least 2 and at most 60 carbon atoms, which may contain not more than one ether oxygen atom, $R^8$ represents a hydrocarbon radical, which may contain not more than one carbonyloxy group, and is preferably from 1 to 4 carbon atoms, $d$ is an integer of from 2 to 6, $e$ is zero or a positive integer of at most 3, such that $(d + e)$ is at most 6, and $f$ and $g$ each represent zero or 1, but are not the same.

Yet further preferred among such polymercaptans are those which are also of the formula $R^9 (OCOR^{10}SH)_h$  X where $R^9$ is an aliphatic hydrocarbon radical of from 2 to 10 carbon atoms, $R^{10}$ denotes $-CH_2-$, $-(CH_2)_2-$, or

and $h$ is an integer of from 2 to 6.

These esters are described in United Kingdom Patent specification No. 1,316,416.

Also preferred are mercaptan-containing polyesters, including esters of monomercaptandicarboxylic acids, of formula

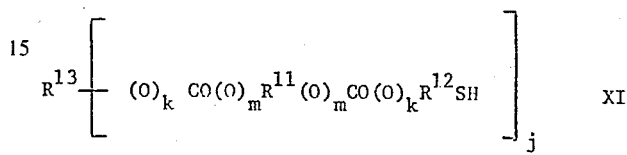  XI where $j$ is an integer of from 1 to 6, $k$ and $m$ are each zero or 1 but are not the same, $R^{11}$ represents a divalent organic radical, linked through a carbon atom or atoms thereof to the indicated $-O-$ or $-CO-$ units, $R^{12}$ represents a divalent organic radical, linked through a carbon atom or carbon atoms thereof to the indicated $-SH$ group and $-O-$ or $-CO-$ units, and $R^{13}$ represents an organic radical which must contain at least one $-SH$ group when $j$ is 1.

Preferably $R^{11}$ denotes, when $k$ is zero, a saturated aliphatic hydrocarbon chain of 2 to 250 carbon atoms, which may be substituted by methyl groups and by $-SH$ groups, and which may be interrupted by ether oxygen atoms and by carbonyloxy groups; when $k$ is 1, $R^{11}$ preferably denotes a. a saturated aliphatic hydrocarbon group of 2 to 10 carbon atoms, which may bear an $-SH$ group, b. a cycloaliphatic-aliphatic hydrocarbon group of 5 to 34 carbon atoms, which may contain ethylenic unsaturation, or c. a mononuclear arylene hydrocarbon group of 6 to 12 carbon atoms.

When $k$ is zero, $R^{12}$ preferably denotes a saturated aliphatic hydrocarbon group of 1 to 3 carbon atoms, which may bear a carboxyl group, and when $k$ is 1, $R^{12}$ preferably denotes a saturated aliphatic hydrocarbon group of 2 to 4 carbon atoms which may be substituted by a hydroxyl group or by a chlorine atom.

$R^{13}$ preferably denotes a. an aliphatic or cycloaliphatic-aliphatic hydrocarbon group of 2 to 51 carbon atoms, which may bear at least one $-SH$ group, b. a mononuclear or dinuclear arylene or arylene-aliphatic hydrocarbon group of 6 to 15 carbon atoms, c. a chain of 4 to 250 carbon atoms interrupted by at least one ether oxygen atom and optionally substituted by at least one $-SH$ group, or d. a chain of 6 to 750 carbon atoms interrupted by at least one carbonyloxy group, optionally interrupted by ether oxygen atoms and optionally substituted by at least one $-SH$ group.

These esters are described in United Kingdom Patent specifications Nos. 1,311,090 and 1,315,820.

Also suitable are esters and ethers of the general formula

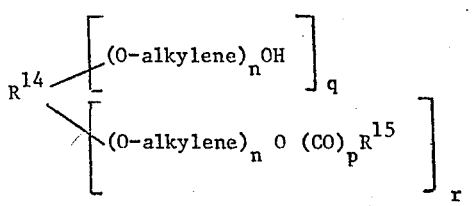
XII where

"alkylene" has the meanings previously assigned, $n$ is a positive integer such that the average molecular weight of the compound is at least 400, but preferably at most 10,000, $p$ is zero or 1, $q$ is zero or a positive integer such that $(q + r)$ is at most 6, $r$ is an integer of from 2 to 6, $R^{14}$ represents the radical of a polyhydric alcohol after removal of $(q + r)$ alcoholic hydroxy groups, and $R^{15}$ represents an aliphatic radical containing at least one mercaptan group.

Preferred amongst the compounds of formula XII are the esters of formula

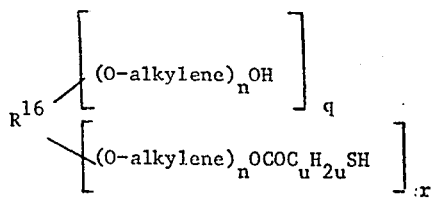
XIII and the ethers of formula

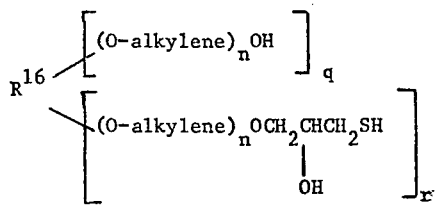
XIV where

"alkylene" $q$, $n$, and $r$ have the meanings previously assigned, $R^{16}$ stands for an aliphatic hydrocarbon radical of from 2 to 6 carbon atoms, and $u$ is 1 or 2.

These esters and ethers are described in United Kingdom Patent specification No. 1,278,934.

Yet other suitable polymercaptans are mercaptan-terminated polysulphides of the general formula

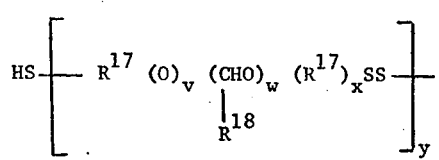

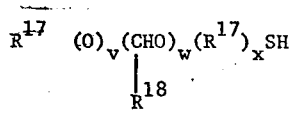
XV where each $R^{17}$ denotes an alkylene hydrocarbon group containing from 2 to 4 carbon atoms, $R^{18}$ denotes —H, —CH$_3$, or —C$_2$H$_5$, $y$ is an integer which has an average value of at least 1, and is preferably such that the average molecular weight of the polymercaptan is at most 10,000, and either $v$ is zero, in which case $w$ and $x$ are each also zero, or $v$ is 1, in which case $w$ is zero or 1 and $x$ is 1.

The preferred polymercaptans of formula XV are those where $R^{18}$ denotes hydrogen and $v$ and $w$ are each 1, $y$ being such that the molecular weight of the polysulphide is from 500 to 8,000.

These polysulphides are described in, inter alia, United Kingdom Patent specification No. 1,316,579.

Another class of polymercaptans comprises mercaptan-terminated poly(butadienes) which are of the general formula

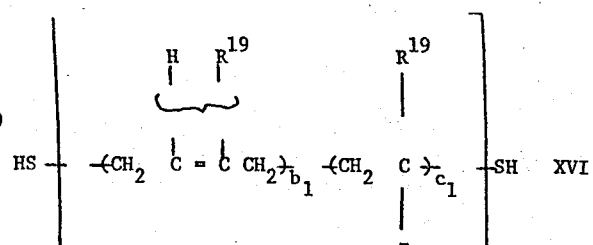
XVI or

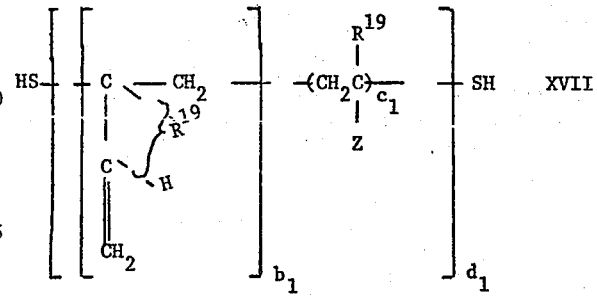
XVII where each $R^{19}$ represents —H or —CH$_3$,

Z represents —CN, —COOH, —CONH$_2$, —COOR$^{20}$, —C$_6$H$_5$, or —OCOR$^{20}$, where $R^{20}$ is an alkyl group of one to eight carbon atoms, $b_1$ is an integer of at least one, $c_1$ is zero or a positive integer, and $d_1$ is an integer such that the average number molecular weight of the polymercaptan is at least 500, but preferably not more than 10,000.

Preferably the polymercaptans of formula XVI and XVII are also of the formula

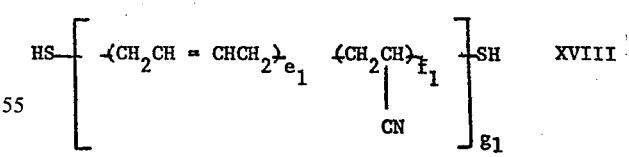
XVIII or

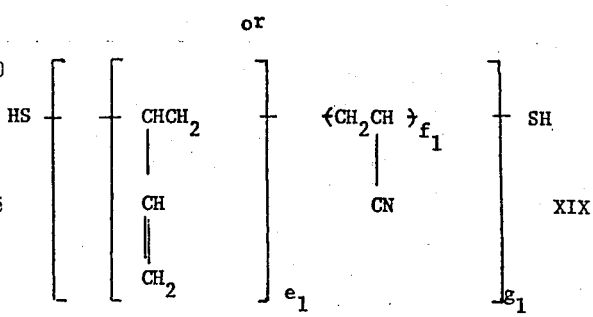
XIX where
$f_1$ is either zero, in which case $e_1$ is 1, or it is 1, in which case $e_1$ is an integer of from 2 to 5, and
$g_1$ is an integer such that the average molecular weight of the polymercaptan is at least 1,250 and at most 5,000.

These polymercaptans are described in United Kingdom Patent specification No. 1,315,124.

Yet other suitable polymercaptans comprise those of the general formula

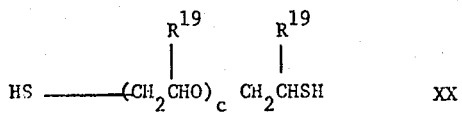

XX where each $R^{19}$ and c have the meanings previously assigned.

Still other suitable polymercaptans are the poly(mercaptocarboxylates) especially the trithioglycollates, the tris(2-mercaptopropionates), and the tris(3-mercaptopropionates), of tris(2-hydroxyethyl) isocyanurate or of tris(2-hydroxypropyl) isocyanurate.

Examples of specific suitable polymercaptans include pentaerythritol tetrakis(thioglycollate), dipentaerythritol hexakis(3-mercaptopropionate), 1,1,1-trimethylolpropane tris(thioglycollate), glycerol tris(thioglycollate), the tris(thioglycollates) of a glycerolpropylene oxide adduct of average molecular weight 700 or 4,000, i.e., of formula

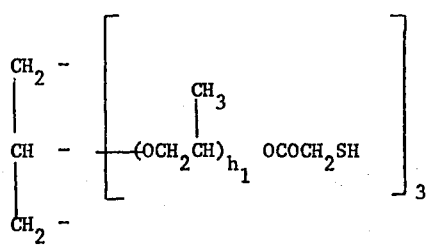

XXI where
$h_1$ is an integer of average value 3.5 or 22.5, the tris(-2-hydroxy-3-mercaptopropyl) ether of formula

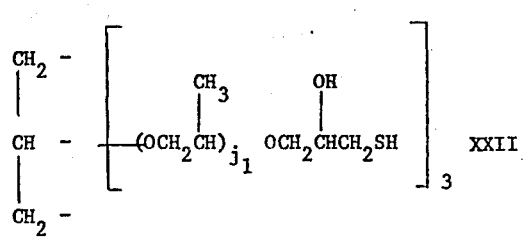

XXII where
$j_1$ is an integer of average value 2.5, a mercaptan-terminated polyester made by the reaction of glycerol (1 mole), adipic acid (4 moles), butane-1,4-diol (4 moles), and thioglycollic acid (3 moles), and the polysulphide of average formula

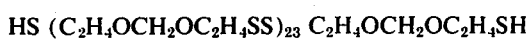

XXIII

Further suitable polymercaptans include tris(2-hydroxyethyl) isocyanurate trithioglycollate, pentaerythritol tetrakis(3-mercaptopropionate), 1,2-bis(2-mercaptoethoxy)ethane, the tris(thioglycollate) of a glycerolpropylene oxide adduct of average molecular weight 600, i.e., of formula XXI where $h_1$ is an integer of average value 2.9, and mercaptan-terminated polyesters made by reaction of poly(oxypropylene) glycol of average molecular weight 1025 (3 moles), thiomalic acid (2 moles), and thioglycollic acid (2 moles); or trimerised linoleic acid (1 mole), poly(oxyethylene) glycol of average molecular weight 300 (3 moles), and thioglycollic acid (3 moles).

Usually, the polymercaptan is employed in a quantity sufficient to supply from 0.8 to 1.2 mercaptan groups per —OCOCH=CHCOOR$^1$ group of the unsaturated ester (i).

Particularly suitable polyenes are the tris(hydrogen maleates) of a poly(oxyethylene)triol or a poly(oxypropylene)triol, or the bis(hydrogen maleates) of a poly(oxyethylene) glycol or of a poly(oxypropylene) glycol. Preferably the polyene contains, per kilogram, from 0.2 to 8.0 gram-equiv. of the group

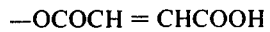

XXIV

Specific examples of suitable polyenes include those of the formula

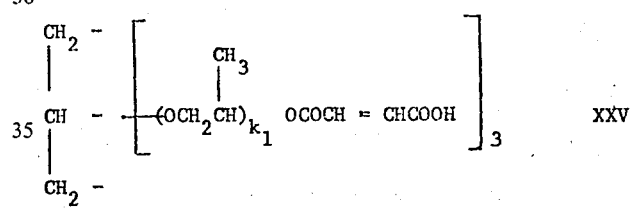

XXV where
$k_1$ is an integer of average value 16.7 or 22.5,

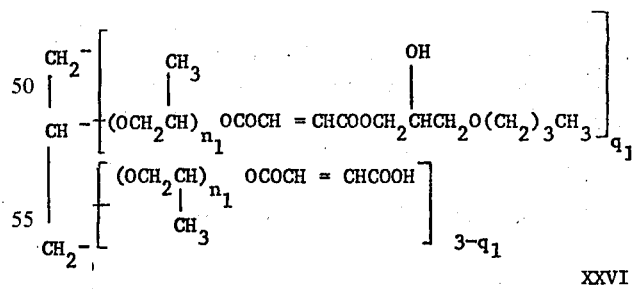

XXVI where
$n_1$ is an integer of average value 22.5, and
$q_1$ is an integer of value 2.7.

Other suitable polyenes include tris(hydrogen maleates) of formula XXV where $k_1$ is an integer of average value 2.9 or 8.1, a partial maleate ester of formula XXVI where $n_1$ is an integer of average value 22.5 and $q_1$ is an integer of average value 1.8, and those of the formula

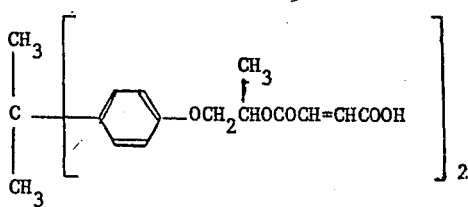

XXVII

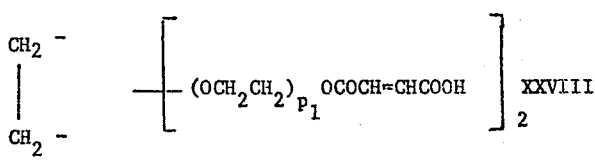

XXVIII where $p_1$ is an integer of average value 12.2, or

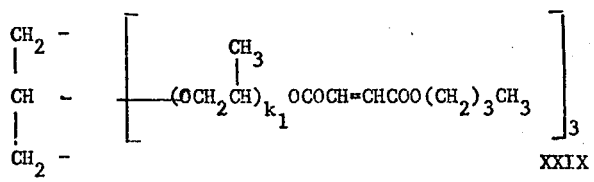

XXIX where $k_1$ is an integer of average value 22.5.

Usually the composition contains at least 0.04 percent, but preferably not more than 10 percent and especially from 0.1 to 2 percent, by weight of the salt or hydroxide of an alkali metal calculated on the combined weight of the polyene and the polymercaptan. Sodium and potassium are the preferred metals. In most cases the salt is one of a weak acid, i.e., one having an acid strength, $-\log K_1$, of at least 5, but sodium nitrate — which is presumably converted into sodium nitrite under burning conditions — has also proved effective. Examples of particularly suitable hydroxides and salts are sodium hydroxide, borax ($Na_2B_4O_7$), sodium carbonate, sodium acetate, sodium sulphide, sodium dithionite ($Na_2S_2O_4$), sodium bicarbonate, sodium tartrate, sodium silicate, sodium fumarate, sodium maleate, potassium hydroxide, potassium carbonate, and potassium bicarbonate.

While curing may take place at room temperature, it can, if desired, be made more rapid by heating the composition, usually at from 35° to 180°C, temperatures in the range 50° to 150°C being the more convenient in practice; the composition is generally heated for from 5 to 20 minutes, depending on the curing temperature employed. Usually the conditions of time and temperature employed in curing have little effect on the fire-resistant properties.

Advantageously an accelerator for the reaction between the unsaturated ester and the polymercaptan is also incorporated, and preferably this accelerator is an organic or inorganic Bronsted base. Examples of suitable bases are primary, secondary, and tertiary amines, such as triethylamine, triethylenediamine, N,N-dimethylaniline, and N-benzyldimethylamine, lower alkanolamines (e.g., mono-, di-, and tri-ethanolamine), lower alkylenepolyamines (e.g., ethylenediamine, diethylenetriamine, triethylenetetramine, tetraethylenepentamine, propane-1,2-diamine, propane-1,3-diamine, hexamethylenediamine and 2,2,4- and 2,3,3-trimethylhexamethylenediamine) also quaternary ammonium bases such as tetramethylammonium hydroxide, and water-soluble inorganic hydroxides (especially sodium hydroxide) and inorganic salts such as trisodium phosphate, sodium carbonate, sodium bicarbonate, sodium pyrophosphate, and sodium acetate. In many cases where an alkali metal hydroxide or a sufficiently basic salt (such as potassium carbonate, sodium carbonate, sodium bicarbonate, and sodium acetate) is employed as the agent imparting increased resistance to burning, curing takes place sufficiently rapidly without the need to add another Bronsted base as accelerator. The accelerator may also be a freeradical catalyst, such as an organic or inorganic peroxide or a persalt, specific examples being benzoyl peroxide, tert.butyl hydroperoxide, di-isopropyl peroxydicarbonate, and ammonium persulphate.

The compositions may contain colouring matter, conventional flame retardants, and difficultly combustible flame-resistant fibrous reinforcing materials such as glass fibres, asbestos fibres, and metal wires. We have found however that, surprisingly, many inorganic particulate fillers do not enhance the flame-retardant effect; indeed, calcium carbonate and china clay decrease the resistance to burning. Particularly if the polyene and/or the polymercaptan has a poly(oxyalkylene) chain the compositions may also contain substances which stabilise the cured product against adverse effects of light. Suitable stabilisers include compounds having at least one phenolic hydroxyl group and at least one alkyl or alkoxy group of 1 to 8 carbon atoms in the same benzene ring, especially compounds having 1 to 4 benzene rings, at least one of which bears a phenolic hydroxyl group ortho to such an alkyl or alkoxy group. Specific examples of suitable stabilisers include 1,1-bis(3,5-di-tert.butyl-2-hydroxyphenyl)butane, 1,1-bis(3-tert.butyl-2-hydroxyphenyl)butane, 1,-1-bis(2-tert.butyl-4-hydroxy-6-methylphenyl)butane, bis(3-tert.butyl-2-hydroxy-5-ethylphenyl)methane, bis-(3-tert.butyl-4-hydroxy-6-methylphenyl)sulphide, octadecyl 3-(3,5-di-tert.butyl-4-hydroxyphenyl)propionate, pentaerythritol tetrakis(3-( 3,5-di-tert.butyl-4-hydroxyphenyl)propionate) and the nickel complex of the formula

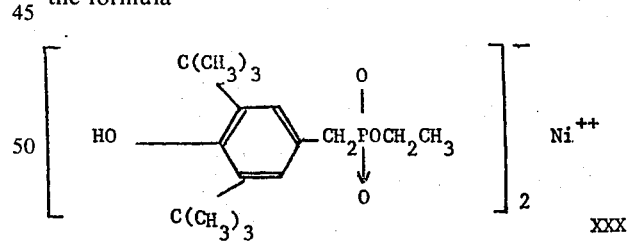

XXX

Usually, about 0.1 to 5 percent by weight of the stabiliser, calculated on the weight of the poly(oxyalkylene)-containing polymercaptan and/or polyene, is employed.

The unsaturated ester and the polymercaptan, which are liquids or fusible or soluble solids, can, as already indicated, be cured in the presence of a salt or a hydroxide of an alkali metal to yield insoluble, infusible, cross-linked structures which are resistant to burning; curing may be accompanied if desired by shaping to form mouldings such as castings or to form coatings and adhesive bonds. The compositions of this invention are therefore useful as moulding resins, floor-covering compositions, casting, dipping, sealing, impregnating, and filling resins, and as bonding agents. They can also be utilised in the form of foams.

The following Examples illustrate the invention. All parts and percentages are by weight unless otherwise indicated and temperatures are in degrees Celsius.

The unsaturated esters and polymercaptans employed were obtained in the following manner.

"Polyol I" is a polyoxypropylenetriol (a glycerol-propylene oxide adduct) of average molecular weight 600. Polyols II and III, are similar, but have average molecular weights of 4,000 and 1,500 respectively.

Polythiol A denotes pentaerythritol tetrathioglycollate.

Polythiol B denotes 1,1,1-trimethylolpropane trithioglycollate.

Polythiol C denotes the trithioglycollate of Polyol II and is of formula XXI, where $h_1$ is an integer of average value 22.5.

Polythiol D is the trithioglycollate of tris(2-hydroxyethyl) isocyanurate.

Polythiol E is 1,2-bis(2-mercaptoethoxy)ethane.

Polythiol F is pentaerythritol tetrakis(3-mercaptopropionate).

Polythiol G is a polyester, made in the following way:-

A mixture of glycerol (1 mole), adipic acid (4 moles), butane-1,4-diol (4 moles) thioglycollic acid (3 moles), toluene-p-sulphonic acid (3 g), and perchloroethylene (350 ml) was heated under reflux in an atmosphere of nitrogen. Water formed during the reaction was removed as its azeotrope with perchloroethylene. The mixture was cooled and washed with water, the organic layer was separated, and the solvent was evaporated off to leave Polythiol G having a thiol content of 2.35 equiv./kg.

Polythiol H, also a polyester, was made similarly, from 3 moles. of a poly(oxypropylene) glycol of average molecular weight 1025, 2 moles of thiomalic acid, and 2 moles. of thioglycollic acid. Its thiol content was 1.15 equiv./kg.

Polythiol J is dipentaerythritol hexakis(3-mercaptopropionate).

Polythiol K is a polyester made in the same way as Polythiol G but from trimerised linoleic acid (1 mole.), poly(oxyethylene)glycol of average molecular weight 300 (3 moles), and thioglycollic acid (3 moles).

Polythiol L is glycerol trithioglycollate.

POLYENE I

A mixture of Polyol II (200 g), maleic anhydride, (14.7 g), and N-benzyldimethylamine (2 g) was stirred at 120° for 100 minutes. The product is substantially the tris(hydrogen maleate), of formula XXV, where $k_1$ is an integer of average value 22.5.

POLYENE II

This was prepared in the same way as Polyene I using, however, Polyol III: Polyene II can also be represented by formula XXV, $k_1$ then denoting an integer of average value 8.1.

POLYENE III 2,2-bis(4-hydroxyphenyl)propane (114 g) was heated with propylene oxide (30.5 g) to reflux temperature (61°), a 40 percent aqueous caustic soda solution (0.57 g) was added, and the reaction was allowed to continue for 50 minutes, during which time the temperature increased to 66°. More 40 percent caustic soda solution (0.57 g) was added and the mixture was heated to reflux for a further 2 hours, the temperature rising to 100°. Propylene oxide (30.5 g) was added, and refluxing was continued for a further 4 hours, during which time the temperature increased to 140°. The solution was cooled to 100° and maleic anhydride (98 g) and N-benzyldimethylamine (2.75 g) were added and the mixture was heated at 120° for 100 minutes to afford Polyolefin III, which is substantially of formula XXVII.

POLYENE IV

To 541.5 g of Polyene I was added 32.7 g of n-butyl glycidyl ether of epoxy content 7.1 equiv./kg, i.e., 0.6 molar proportion, and the mixture was heated at 120°C for 100 minutes, by which time the epoxy content of the product was zero.

Polyene IV is substantially of the formula XXVI where $n_1$ is an integer of average value 22.5 and $q_1$ is an integer of average value 1.8.

POLYENE V

This was prepared in the same way as Polyene I using, however, Polyol I: Polyene V can be represented by formula XXV, where $k_1$ denotes an integer of average value 2.8.

POLYENE VI

A poly(oxyethylene) glycol of average molecular weight 600 (300 g), maleic anhydride (98 g), and triethylamine (6 g) were mixed and heated for 2 hours at 80°C. The product had an acid value of 2.48 equiv./kg (theoretical 2.48 equiv./kg) and is substantially of formula XXVIII where $p_1$ is an integer of average value 12.2.

POLYENE VII

A mixture of Polyene I (430 g), n-butanol (111 g), toluene-p-sulphonic acid (5.5 g), and toluene (400 g) was heated under reflux and water formed during the reaction was removed continuously as its azeotrope with toluene. The mixture was then evaporated on a rotary evaporator. The product is the tri n-butyl ester of Polyene I, i.e., is of the formula XXIX.

EXAMPLE I

Polyene I (14 parts) and Polythiol A (1 part) were mixed at about 20° and the additive (as shown in Table I) was stirred in, the mixture (which contains 1 SH group equivalent per ethylenic double bond) then being poured quickly into a demountable brass mould which had been coated internally with a silicone release agent. After being cured (this usually taking only a few minutes at room temperature, although in some cases the compositions were also subjected to a post-cure heating period) the sample was removed from the mould as a casting 12.7 × 1.27 × 0.63 cm.

The samples were tested for flammability by the procedure laid down in ASTM D635. In this test, lines are marked 2.5 cm. from each end of the casting. The sample is then clamped at one end and mounted, at 45° to the horizontal, over a fine wire gauze, and a blue bunsen burner flame 2.5 cm high is applied to one end for 30 seconds. If the sample does not burn after the bunsen burner has been removed, the sample is then subjected to the flame for a further 30 seconds. Should the sample not continue to burn after this treatment, it is considered 'non-burning by this test -a'. If combustion occurs but is extinguished before reaching the mark 2.5 cm from the further end the sample is 'self-extinguishing -c' and the length burned from the initial mark is recorded. If the burning continues to the further mark, the sample is deemed to be 'burning by this test -b' and the rate of burning is recorded in cm/minute.

Table I shown the results obtained using compositions containing the various additives: Experiments Nos. 1 to 8 are for purposes of comparison, the remaining Experiments illustrate the invention.

EXAMPLE 2

The procedure of Example 1 was repeated, using, however, nonstoichiometric proportions of the reactants: 17 and 11.2 parts of Polyene I were used per part of Polythiol A with, respectively, 0.055 and 0.065 part of sodium hydroxide (added as a 1 percent aqueous solution). The first of the compositions was also post-cured by heating at 150° for 15 minutes. Both cured products were rated "a non-burning" by the ASTM D 635 test.

TABLE 1

| No. | Additive Designation | % of composn. | Cure | Class | Results ASTM D635 remarks | ASTM D 2863 % |
|---|---|---|---|---|---|---|
| 1 | — | — | 20° | b | 6.8 cm/min | — |
| 2 | — | — | 120°/15 min | b | 6.3 cm/min | — |
| 3 | DETA[1] | 0.066 | 20° | b | 4.3 cm/min | — |
| 4 | DETA[1] | 0.066 | 120°/15 min | b | 4.0 cm/min | — |
| 5 | NH$_4$OH[1] | 0.066 | 20° | b | 2.8 cm/min | — |
| 6 | Ba(OH)$_2$[1] | 0.066 | 20° | b | 4.3 cm/min | — |
| 7 | Al(OH)$_3$[1] | 0.066 | 20° | b | 5.6 cm/min | — |
| 8 | Al(OH)$_3$[4] | 0.33 | 20° | b | 5.3 cm/min | — |
| 9 | NaOH[1] | 0.066 | 20° | a | nonburning | — |
| 10 | Na$_2$B$_4$O$_7$.10H$_2$O[2] | 1.32 | 20° | a | nonburning | — |
| 11 | NaOH[1] | 0.066 | 150°/15 min | a | nonburning | — |
| 12 | Na$_2$CO$_3$ | 0.5 | 20° | a | nonburning | 23 |
| 13 | Na$_2$CO$_3$ | 1.0 | 20° | a | nonburning | — |
| 14 | Na$_2$CO$_3$ | 2.3 | 20° | a | nonburning | — |
| 15 | Na$_2$CO$_3$ | 4.5 | 20° | a | nonburning | 27 |
| 16 | Na$_2$CO$_3$ | 6.5 | 20° | a | nonburning | 29 |
| 17 | Na$_2$CO$_3$ | 8.5 | 20° | a | nonburning | 33 |
| 18 | Na acetate[1] | 0.066 | 20° | a | nonburning | — |
| 19 | Na$_2$S[1] | 0.066 | 20° | a | nonburning | — |
| 20 | Na$_2$S$_2$O$_4$.2H$_2$O | 0.066 | 20° | a | nonburning | — |
| 21 | NaHCO$_3$[1] | 0.066 | 20° | a | nonburning | — |
| 22 | Na tartrate dihydrate | 0.066 | 20° | a | nonburning | — |
| 23 | NaNO$_3$[2] | 1.32 | 20° | a | nonburning | — |
| 24 | NaNO$_3$[3] | 0.67 | 20° | a | nonburning | — |
| 25 | Li$_2$CO$_3$[1] | 0.066 | 20° | c | 0.8 cm burnt | — |
| 26 | KOH[1] | 0.066 | 20° | c | 0.9 cm burnt | 22 |

Notes: added as
[1] an aqueous 1% solution/suspension
[2] an aqueous 20% solution
[3] an aqueous 10% solution
[4] an aqueous 5% suspension Replicates of certain samples were also tested according to the procedure of ASTM D2863. The results from this test give the relative ignition ranking of materials. The sample is burned in a measured mixture of oxygen and nitrogen in which the percentage of oxygen is decreased such that the least amount necessary to support combustion is determined. The test pieces were between 70 and 150 cm long, 6.5 ± 0.5 mm wide and 3.0 ± 0.5 cm thick, and ignition was from the top of the sample. An index of 20 percent indicates that the material will burn in air: values above this show degrees of fire-retardancy.

EXAMPLE 3

The procedure of Example 1 was repeated, using other combinations of polyene and polymercaptan. The samples were all cured at 20°; the results obtained are shown in Table II.

TABLE II

| No. | Polyene No. | Parts | Polythiol Designation | Parts | Additive Designation | % of comp. | Results ASTM D635 Class | remarks |
|---|---|---|---|---|---|---|---|---|
| 29 | I | 1 | C | 1 | NaOH[3] | 0.36 | a | nonburning |
| 30 | II | 5.86 | A | 1 | NaOH | 0.15 | a | nonburning |
| 31 | II | 5.86 | A | 1 | Na$_2$CO$_3$ | 3.64 | a | nonburning |
| 32 | III | 2.5 | A | 1 | NaOH[3] | 0.285 | a | nonburning |
| 33 | I | 1 | K | 1 | NaOH[3] | 0.312 | a | nonburning |
| 34 | II | 3.67 | D | 1 | NaOH[3] | 0.214 | a | nonburning |
| 35 | I | 15.7 | E | 1 | NaOH[3] | 0.30 | a | nonburning |
| 36 | II | 4.5 | F | 1 | NaOH[3] | 0.545 | a | nonburning |
| 37 | V | 1 | G | 1.37 | NaOH[3] | 0.55 | a | nonburning |
| 38 | II | 1 | H | 1.5 | NaOH | 6.8 | a | nonburning |
| 39 | I | 14 | J | 1 | NaOH | 0.13 | a | nonburning |
| 40 | I | 12 | B | 1 | NaOH | 0.15 | a | nonburning |

TABLE II – Continued

| No. | No. | Polyene Parts | Polythiol Designation | Parts | Additive Designation | % of comp. | Results ASTM D635 Class | remarks |
|---|---|---|---|---|---|---|---|---|
| 41 | VII | 7 | A | 1 | NaOH[3] | 1.84 | a | nonburning |
| 42 | VI | 4 | A | 1 | NaOH | 0.13 | a | nonburning |
| 43 | IV | 14 | A | 1 | NaOH | 0.13 | c | 0.6 cm burnt |
| 44 | I | 12.3 | L | 1 | $K_2CO_3$ | 0.2 | a | nonburning |

We claim:

1. A composition which cures to form a product resistant to burning, comprising
   i. an unsaturated ester having an average molecular weight of 250 to 10,000, of the general formula

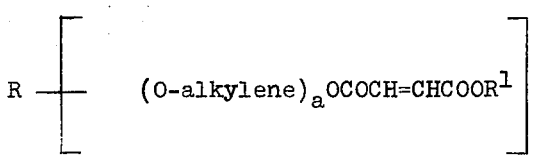

where
   a is an integer of at least 1,
   b is an integer 2 to 6,
   R denotes the radical, of 3 to 60 carbon atoms, of valency b remaining after removal of b alcoholic hydroxyl groups from a polyhydric alcohol or after removal of b phenolic hydroxyl groups from a polyhydric phenol, or the acyl radical remaining after removal of b OH groups from a compound having at least b carboxyl groups,
   each alkylene group contains a chain of 2 to 6 carbon atoms between consecutive oxygen atoms,
   $R^1$ represents —H or the monovalent residue of an alcohol after removal of an —OH group,
   ii. a polymercaptan having an average molecular weight of at most 10,000 and containing, per average molecule, two to 6 mercaptan groups, the sum of the number of the indicated ethylenic double bonds in the unsaturated ester (i) and the number of the mercaptan groups in the polymercaptan (ii) being more than 4 and at most 8, and
   iii. 0.04 to 10 percent by weight of a salt or hydroxide of an alkali metal, calculated on the combined weight of the said polymercaptan and unsaturated ester.

2. A composition according to claim 1, in which the said salt is of an acid having an acid strength, -log $K_1$, of at least 5, or is sodium nitrate.

3. A composition according to claim 1, in which the polyene contains from 0.2 to 8.0 gram-equiv. of the group of formula -CH=CHCOOH per kilogram.

4. A composition according to claim 1, in which the polymercaptan supplies from 0.8 to 1.2 mercaptan groups per -CH=CHCOOH group of the polyene.

5. A composition according to claim 1, in which the polymercaptan is an ester of a monomercaptancarboxylic acid with a polyhydric alcohol or of a monomercaptanmonohydric alcohol with a polycarboxylic acid.

6. A composition according to claim 5, in which the polymercaptan is of the formula

where
   $R^7$ represents an aliphatic or araliphatic hydrocarbon radical of 2 to 60 carbon atoms, or an aliphatic or araliphatic hydrocarbon radical of at least 2 and at most 60 carbon atoms which contains one ether oxygen atom,
   $R^8$ represents a hydrocarbon radical, or a hydrocarbon radical which contains one carbonyloxy group,
   $d$ is an integer of from 2 to 6,
   $e$ is zero or a positive integer of at most 3, such that $(d + e)$ is at most 6, and
   $f$ and $g$ each represent zero or 1, but are not the same.

7. A composition according to claim 5, in which the polymercaptan is a polyester of formula $$R^{13} - (O)_k CO(O)_m R^{11}(O)_m CO(O)_k R^{12}SH )_j$$

where
   $j$ is an integer of from 1 to 6,
   $k$ and $m$ are each zero or 1 but are not the same,
   $R^{11}$ represents a divalent organic radical, linked through a carbon atom or carbon atoms thereof to the indicated —O— or —CO— units,
   $R^{12}$ represents a divalent organic radical, linked through a carbon atom or carbon atoms thereof to the indicated -SH group and —O— or —CO— units, and
   $R^{13}$ represents an organic radical, which must contain at least one -SH group when j is 1, linked through a carbon atom or carbon atoms thereof to the indicated —O— or —CO— units.

8. A composition according to claim 1, in which the polymercaptan is an ether of the general formula

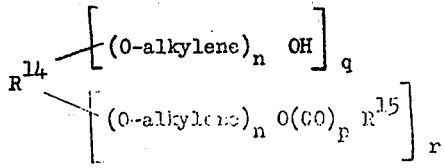

where
   each alkylene group contains a chain of 2 to 6 carbon atoms between consecutive oxygen atoms,
   $n$ is a positive integer such that the average molecular weight of the polymercaptan is at least 400,
   $p$ is zero or 1, $q$ is zero or a positive integer such that $(q + r)$ is at most 6, $r$ is an integer of from 2 to 6, $R^{14}$ represents the radical of a polyhydric alcohol after removal of $(q + r)$ alcoholic hydroxyl groups, and $R^{15}$ represents an aliphatic radical containing at least one mercaptan group.

9. A composition according to claim 1, in which the polymercaptan is of the formula

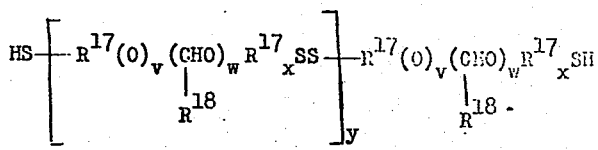

where $R^{17}$ denotes an alkylene hydrocarbon group containing from 2 to 4 carbon atoms, $R^{18}$ denotes —H, —CH$_3$, or —C$_2$H$_5$, $y$ is an integer which has an average value of at least 1, and either $v$ is zero, in which case $w$ and $x$ are each also zero, or $v$ is 1, in which case $w$ is zero or 1 and $x$ is 1.

10. A composition according to claim 1, in which the polymercaptan is a mercaptan-terminated poly(butadiene) of the formula

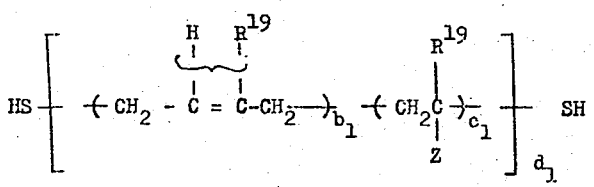

or

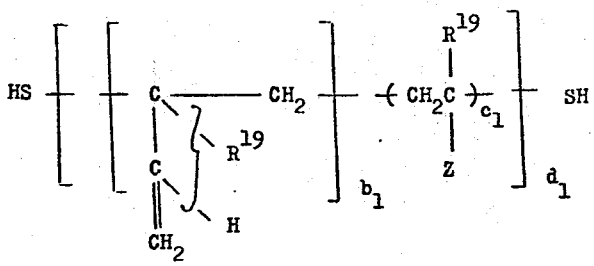

where each $R^{19}$ represents —H or —CH$_3$

Z represents —CN, —COOH, —CONH$_2$, —COOR$^{20}$, —C$_6$H$_5$, or —OCOR$^{20}$, where $R^{20}$ is an alkyl group of one to eight carbon atoms, $b_1$ is an integer of at least one, $c_1$ is zero or a positive integer, and $d_1$ is an integer such that the average number molecular weight of the polymercaptan is at least 500.

11. A composition according to claim 1, in which the polymercaptan is of the formula

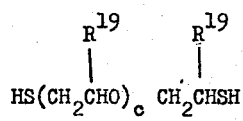

where each $R^{19}$ represents —H or —CH$_3$ and $c$ is an integer of 1 to 4.

12. A composition according to claim 1, in which the polymercaptan is a poly(monomercaptancarboxylate) of tris(2-hydroxyethyl) isocyanaurate or of tris(2-hydroxypropyl) isocyanurate.

13. A composition according to claim 1, which contains a Bronsted base as accelerator.

14. A process for forming a product resistant to burning which comprises curing a polymercaptan having an average molecular weight of at most 10,000 and containing, per average molecule, at least two and at most 6 mercaptan groups, with an unsaturated ester having an average molecular weight of at least 250 and at most 10,000, of the general formula

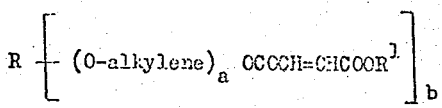

where $a$ is an integer of at least 1, $b$ is an integer of 2 to 6,

R denotes the radical, of 3 to 60 carbon atoms, of valency b, remaining after removal of b alcoholic hydroxyl groups from a polyhydric alcohol or after removal of b phenolic hydroxyl groups from a polyhydric phenol, or the acyl radical remaining after the removal of b OH groups from a compound having at least b carboxyl groups, each "alkylene" group contains a chain of 2 to 6 carbon atoms between consecutive oxygen atoms, $R^1$ represents —H or the monovalent residue of an alcohol after removal of an —OH group, the sum of b and the number of mercaptan groups in the polymercaptan being more than 4 and at most 8, in the presence of at least 0.04 percent and at most 10 percent by weight, calculated on the combined weight of the said polymercaptan and unsaturated ester, of a salt or hydroxide of an alkali metal.

* * * * *